United States Patent [19]

Jalan et al.

[11] 4,192,907

[45] Mar. 11, 1980

[54] ELECTROCHEMICAL CELL ELECTRODES INCORPORATING NOBLE METAL-BASE METAL ALLOY CATALYSTS

[75] Inventors: Vinod M. Jalan, Manchester; Douglas A. Landsman; John M. Lee, both of West Hartford, all of Conn.

[73] Assignee: United Technologies Corporation, Hartford, Conn.

[21] Appl. No.: 922,003

[22] Filed: Jul. 3, 1978

[51] Int. Cl.² ............................................. H01M 8/08
[52] U.S. Cl. ..................................... 429/40; 429/44; 429/46; 75/172 R; 252/466 PT; 252/477 Q
[58] Field of Search ........................... 429/40, 44, 46; 252/466 R, 466 PT, 472, 477 Q, 425.3; 75/172 R, 172 G

[56] References Cited

U.S. PATENT DOCUMENTS

| | | | |
|---|---|---|---|
| 2,384,501 | 9/1945 | Streicher | 252/466 PT X |
| 3,340,097 | 9/1967 | Hess et al. | 429/44 |
| 3,341,936 | 9/1967 | Sanstede et al. | 252/472 |
| 3,380,934 | 4/1968 | Batzold | 252/477 Q |
| 3,414,439 | 12/1968 | Adlhart | 429/44 X |
| 3,424,619 | 1/1969 | Adlhart et al. | 429/40 X |
| 3,506,494 | 4/1970 | Adlhart | 429/44 X |
| 3,989,515 | 11/1976 | Reiff | 75/172 R |

*Primary Examiner*—Anthony Skapars
*Attorney, Agent, or Firm*—Stephen E. Revis

[57] ABSTRACT

A novel and improved fuel cell electrode includes a finely divided noble metal-base metal alloy catalyst. The catalytic activity of noble metal in the electrode is greater than the catalytic activity of the same unalloyed noble metal. Theoretically any base metal may be advantageously alloyed with the noble metal and will yield improved catalytic activity. Preferably the finely divided alloy is supported.

10 Claims, No Drawings

ELECTROCHEMICAL CELL ELECTRODES INCORPORATING NOBLE METAL-BASE METAL ALLOY CATALYSTS

BACKGROUND OF THE INVENTION

1. Field of the Invention

The present invention relates to the production of supported noble metal alloy catalysts for use in fuel cell electrodes and other catalytic structures.

2. Description of the Prior Art

A fuel cell is a device which converts the energy of a chemical reaction between a fuel and oxidant directly into low voltage, direct current electricity. The problems encountered in obtaining an efficient fuel cell are essentially those of chemical kinetics. It is necessary that the reactions of the fuel and oxidant occur in such manner that the amount of energy degraded into heat is as small as possible. At the same time, the reaction rate of the cell must be high enough to produce economically sufficient current from a cell of practical size. For this reason it is customary to incorporate catalysts in the fuel cell which accelerate the reactions occurring at the electrodes.

A typical fuel cell comprises a fuel electrode or anode, an oxidant electrode or cathode, an electrolyte positioned between the electrodes and means to introduce fuel and oxidant to their respective electrodes. Each electrode is typically comprised of a substrate (such as wetproofed paper made from graphitized carbon fibers) with a layer of catalyst disposed on the surface which faces the electrolyte.

In operation, the fuel (commonly hydrogen) is fed to the anode where it is oxidized at the catalytic surface in the presence of electrolyte with the liberation of electrons. Simultaneously oxygen (or air) is fed to the cathode where it is reduced at a catalytic surface in the presence of electrolyte with the consumption of electrons. The electrons generated at the anode are conducted to the cathode through wires external to the cell and constitute a flow of electrical current which can be made to perform useful work.

To obtain fuel cells which are practical on a commercial scale, a great deal of research has been carried out in an effort to find improved catalysts. For example, the prior art has demonstrated that the activity per unit mass of a catalyst, usually a noble metal, can be enhanced by supporting it in the form of finely divided particles, upon either metallic or carbonaceous base materials of high surface area. This approach has proved especially useful in fuel cell applications utilizing acid electrolytes, for example, where particulate platinum is highly dispersed on a conductive support material such as carbon black and the platinum-covered carbon black, mixed with a suitable bonding agent, is applied as a thin layer on a conductive carbon paper or cloth to form an electrode.

In addition, the prior art has demonstrated that certain unsupported noble metal alloy catalysts exhibit increased catalytic activity and/or increased resistance to sintering and dissolution in fuel cells and other electrochemical and chemical processes when compared to the performance of the unalloyed noble metal catalyst. For example, U.S. Pat. No. 3,506,494 describes a method for producing a ternary alloy for use at the anode of a fuel cell. The ternary alloy consists of platinum, ruthenium and a metal selected from the following: gold, rhenium, tantalum, tungsten, molybdenum, silver, rhodium, osmium, or iridium. Although it states in column 3, at lines 67-70, that the alloy catalysts may be dispersed on a high surface area carrier such as carbon powder, no method is taught for doing this.

U.S. Pat. No. 3,428,490 describes another method for making a fuel cell anode electrode. In this case unsupported platinum is alloyed with aluminum and applied to an electrode substrate. The aluminum is then leached out to the extent possible to form the finished electrode. The removal of the aluminum produces a large number of reaction sites or voids in the electrode. It is stated that the voids increase the surface area and thus the activity of the catalyst. Although this patent indicates in column 6 at lines 26-29 that some aluminum may still be present in the electrode composition after leaching, it is believed that the amount remaining is not significant and it would be present only in those areas which could not be reached by the leaching solution. The patent teaches no method for making a noble metal-aluminum alloy which is supported.

Patents of more general interest which relate to platinum alloy catalysts are U.S. Pat. Nos. 3,340,097 (platinum-tin-ruthenium) and 3,615,836.

It is known that some alloys may be made by co-reducing intimate mixtures of reduceable metal salts. For example, the method of co-reducing metal salts in the presence of a support material is used to make a supported, finely divided platinum-iron alloy as explained in an article by C. Bartholomew and M. Boudart titled "Preparation of a Well Dispersed Platinum-Iron Alloy on Carbon" from the *Journal of Catalysis*, pp. 173-176, V25, #1, April 1972. However, salts of certain metals are not readily reduced. Such metals are those which form refractory metal oxides, e.g., Ti, Ce, Mg, Al, Si, and Ca.

It is apparent from the foregoing that there is still no commercially viable process for preparing high surface area catalysts of noble metals alloyed with the metallic component of a refractory metal oxide. It has been observed, however, that platinum and other noble metals and noble metal alloys, in bulk form, react with many refractory metal oxides at high temperatures to form solid solution alloys or intermetallic alloy compounds and that these reactions are accelerated by the presence of reducing agents in the high temperature environment of, for example, carbon, hydrogen, carbon monoxide and certain organic vapors. "Platinum Metals Review 20," No. 3, p. 79, July 1976.

Finally, returning to the subject of fuel cells, all base metals, including the refractory metals, are notoriously susceptible to oxidation and dissolution at cathodes in acid fuel cells, and it is not believed that alloys of noble metals with base metals have ever been considered for use at cathodes for that very reason, whether supported or unsupported.

As used herein, "noble metals" refers to those metals of the second and third triads of Group VIII of the Periodic Table, also referred to as the palladium and platinum groups, respectively. These metals are ruthenium, rhodium, palladium and osmium, iridium and platinum.

SUMMARY OF THE INVENTION

Accordingly, an object of the present invention is to provide an alloy catalyst with improved activity.

A more particular object of the present invention is an improved electrochemical cell electrode incorporating said alloy catalyst.

In the following discussion of this invention and in the appended claims, when catalytic activity comparisons are made they are intended to be comparisons of mass activity. Mass activity is an arbitrarily defined measure of the effectiveness of a catalyst per unit weight of the catalytic material. In the case of fuel cells with phosphoric acid as electrolyte we define the mass activity of the cathode catalyst (in mA/mg) as the maximum current available due to oxygen reduction at 0.900 volts, the potential being measured relative to an unpolarized $H_2$/Pt reference electrode at the same temperature and pressure in the same electrolyte. A greater mass activity can be achieved by either increasing the surface area of the catalyst (e.g., by reducing the particle size) or by increasing its specific activity. Specific activity is defined as the $O_2$ reduction current, as specified above which is available per unit surface area of the noble metal (i.e., $\mu A/cm^2$). The greater mass activity of the alloy of the present invention (in comparison to the mass activity of the unalloyed noble metal) is attained through improvement in the specific activity of the catalytic material in comparison to the specific activity of the unalloyed noble metal.

The invention is an electrochemical cell electrode comprising a finely divided noble metal-base metal alloy catalyst having a catalytic activity which is greater than the catalytic activity of the unalloyed noble metal. If the novel electrode of the present invention is a cathode for a phosphoric acid fuel cell the preferred noble metal is platinum and the alloy is preferably supported on carbon particles.

The word "alloy" as used above and hereinafter in the specification and claims is intended to encompass within its meaning solid solutions and intermetallic compounds of the metals being combined.

Preferably the reaction is effected by intimately contacting finely divided supported noble metal particles with finely divided particles of a base metal oxide and heating to a sufficiently high temperature (preferably in a reducing environment) to thermocatalytically reduce the base metal oxide and simultaneously form a finely divided supported alloy catalyst containing the noble metal and the base metal. This catalyst is thereupon incorporated into a fuel cell electrode, and preferably a cathode electrode. Surprisingly, the catalytic activity for the reduction of oxygen of this alloy is greater than both the catalytic activity of the supported unalloyed noble metal and the same alloy unsupported. Although during this process there is generally a loss in the unalloyed noble metal catalyst surface area due to thermal sintering, this loss in surface area is more than compensated by the increased specific activity of the resulting catalyst.

The method is equally well suited to making finely divided unsupported as well as supported alloy catalysts for electrochemical cells. However, since finely divided unsupported noble metals are limited, generally, to less than 50 $m^2$/g of noble metal, this method is best practiced by using supported finely divided noble metals, which can be prepared in surface areas generally greater than 100 $m^2$/g of noble metal.

Although this method may be used to alloy any noble metal with most any base metal, it is particularly well suited for making alloy catalysts of noble metals with refractory metals. (Refractory metals are herein defined as any metal which forms a refractory metal oxide.) We have found that alloy catalysts of a noble metal and certain refractory metals are most preferred for oxygen reduction at the cathode of fuel cells. Notwithstanding the foregoing, cathode electrodes incorporating alloy catalysts of a noble metal with any base metal and made by any method are contemplated as being within the scope of the present invention, such as alloys made by the method described in the hereinabove referenced paper by Bartholomew and Boudart.

A novel electrochemical cell electrode may be made using this alloy catalyst by applying, for example, a layer of the catalyst to a suitable substrate (usually but not necessarily electrically conductive) by any of numerous and well known methods. Preferred electrodes of the present invention include supported alloy catalysts having surface areas greater than 30 $m^2$/g of noble metal. In acid fuel cells the supported alloy catalysts preferably have surface areas greater than 50 $m^2$/g of noble metal. By proper selection of the noble metal and the base metal the catalyst can be tailored to suit particular service conditions of the electrode. Platinum is the preferred noble metal when the alloy is to be used as a catalyst in a phosphoric acid fuel cell.

Commonly owned, copending U.S. patent application Ser. No. 922,044 titled "Noble Metal-Refractory Metal Alloys and Method for Making" by V. Jalan and D. Landsman, and filed on even date herewith claims the herein described novel finely divided alloy catalysts, per se, and the method for making said catalysts.

Commonly owned, copending U.S. application Ser. No. 922,005 titled "Noble Metal/Vanadium Alloy Catalyst and Method for Making" by V. Jalan filed on even date herewith describes a finely divided noble metal-vanadium alloy and method for making said alloy.

The foregoing and other advantages and objects of the present invention will become more fully apparent from the following description of preferred embodiments.

DESCRIPTION OF THE PREFERRED EMBODIMENTS

The alloy catalyst used in the electrodes of the present invention is preferably made by starting with supported unalloyed noble metal catalysts in the form of finely-divided particles dispersed uniformly over the surface of a suitable support material. This form of the catalyst provides a high surface area, high activity catalytic structure, especially when the support material also is characterized by high surface area. (For some electrode applications finely divided unsupported noble metal alloy catalysts may be desirable. In that case the starting material would be finely divided, unsupported unalloyed noble metal.) It is to be understood that "unalloyed noble metal catalyst" includes not only the noble metals discussed hereinbefore in elemental form but also mixtures or alloys of one noble metal with another. Other metals not in the second and third triads of Group VIII of the Periodic Table are excluded. In general, the support material provides bulk to the catalyst making it practical to fabricate structures containing very small quantities of the noble metal while allowing attainment of much higher surface areas (and thus higher catalytic activity per unit mass of noble metal) than are achievable with the unsupported noble metal, or are achievable with an unsupported noble metal alloy.

A variety of materials (e.g., silica and alumina) are used as supports for noble metal catalysts in industry. The usual criterion for selecting a material for use as a support is that it be chemically stable in the environment in which the catalyst operates. For electrochemical applications the support material should also be electrically conductive and materials such as carbon, graphite or metals are commonly used. The characteristics required of a successful support material are well known or can be easily determined by those skilled in the art.

An example of a preferred supported unalloyed noble metal catalyst of the type described above which has found use in electrodes for fuel cells employing a phosphoric acid electrolyte is a conductive carbon black such as Vulcan XC-72 (made by Cabot Corp. of Billerica, Mass.) having finely-divided particles of platinum uniformly dispersed over its surface. Techniques for providing the uniform dispersion of finely divided platinum particles on the carbon black and other support materials are well known in the art and are not considered to be part of the novel aspects of the present invention. Carbon is a preferred support material for many fuel cell applications. Some types of carbons other than carbon black which may be used are graphite, partially graphitized carbon, and acetylene black.

In accordance with this method, the supported unalloyed noble metal catalyst in finely divided form (i.e., submicron, high surface area) is reacted with a finely divided base metal oxide, the metallic component of which is capable of significantly enhancing the catalytic activity for the reduction of oxygen and/or other physicochemical properties of the noble metal when alloyed therewith. The first step in effecting the reaction is to provide intimate contact between the metal oxide particles and the supported noble metal catalyst particles. Although a variety of contacting techniques may be utilized, those found especially useful involve soaking the supported catalyst in a colloidal dispersion of the metal oxide or soaking the supported catalyst in a solution of a metal compound which can be subsequently reacted or converted to the desired metal oxide by simple and well known chemical processes such as the thermal decomposition of the carbonate, sulfate or hydroxide or by hydrolysis of some other salt. The former technique may be used with a metal oxide which is readily available in finely divided form. The latter technique may be used when the metal oxide is not readily available in finely divided form. After the oxide-impregnated catalyst is dried, the product is an intimate mixture of fine noble metal particles and fine metal oxide particles both supported on the support material of the original unalloyed noble metal. Further details of these techniques are provided in the examples set forth below for purposes of illustration.

The intimate mixture of supported noble metal particles and base metal oxide is then heated to a sufficiently high temperature that the metal oxide is reduced by the combination of temperature and proximity to the noble metal particles, whereby the metallic component of the metal oxide forms a solid solution or intermetallic compound with the noble metal (i.e., an alloy). Typically, the intimate mixture must be heated to at least about 600° C., preferably 800°–1000° C., to achieve the desired reaction. Of course, the time at temperature must be sufficient to complete the reaction and will vary with the metal oxide chosen and the amount used, times of 1–16 hours generally being satisfactory in this regard.

The heating is usually conducted in a reducing atmosphere to accelerate the reaction, but an inert atmosphere or vacuum may be used in certain instances where a reducing environment is present. For example, with a platinum-covered carbonaceous support material and metal oxide, the following reaction can occur to accelerate the reaction:

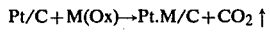

$$Pt/C + M(Ox) \rightarrow Pt.M/C + CO_2 \uparrow$$

where M represents a metal. Of course, a small but relatively harmless amount of the carbon support material, which provides the locally reducing environment, is consumed in this situation. In addition, some thermal sintering of the noble metal usually occurs during the heat treatment, but results have indicated that the loss is relatively insubstantial considering the significantly increased specific activity or improved performance of the resulting alloy catalyst when used in an electrochemical cell cathode for the reduction of oxygen.

Some base metal oxides may not be available in finely divided form and there may be no presently known method for making these finely divided oxides. This does not mean, however, that if the finely divided oxide were available it would not work. On the contrary, theoretically any base metal may be alloyed with a noble metal by the disclosed process. The base metals which we have already alloyed with platinum by the present method and used at the cathode of a phosphoric acid fuel cell are tungsten, aluminum, titanium, silicon, aluminum-silicon, cerium, strontium-titanium, and tin. All these alloys provided increased catalytic activity when compared to the catalytic activity of the unalloyed, supported noble metal. Note that all the base metals except tin are refractory metals. Of those which we have tried, we have not as yet found any which do not work well as a fuel cell cathode catalyst provided the finely divided form of the metal oxide can be obtained.

In the foregoing description the precursor noble metal is a supported noble metal and one step in the process involves putting the metal oxide particles on the support with the noble metal particles. Actually, it does not matter how these two types of particles arrive on the support material. For example, unsupported noble metal particles and metal oxide particles could be co-deposited onto the support material. It is important, however, that both types of particles be finely divided and uniformly dispersed over the surface of the support. Preferably the size of the oxide particles should be about the same as that of the noble metal particles. If the oxide particles are too large or are poorly dispersed the particles of the noble metal may suffer excessive sintering during heating by coalescing with each other instead of reacting with the oxide particles. This could result in an unacceptable loss in catalytic surface area. For the same reason temperatures in excess of 1000° C. should be avoided. In the context of the present invention, finely divided particles are particles of submicron size.

The methods described above provide means for significantly enhancing the catalytic activity of an unalloyed noble metal catalyst. Also, the specificity, resistance to sintering, electronic and other physical properties of the catalyst can be tailored to particular service applications by the proper selection of the noble metal and base metal.

The most effective amount of base metal in the alloys of the present invention will vary depending upon the application to which the catalyst is to be put and the materials making up the alloy. As little as one percent and perhaps even less may provide a noticeable increase in cathode catalytic activity. The best proportion can be determined through experimentation. The maximum amount of base metal is determined by the solubility limits of the base metal in the nobel metal.

The following examples are offered to illustrate, in more detail, methods for making the novel finely divided alloys of the present invention for use in acid fuel cell electrodes:

Example 1—Pt-Ti/C

Twenty grams of catalyst consisting of 10% Pt, by weight, supported on carbon black was ultrasonically dispersed in 800 ml distilled water. The surface area of the platinum in the catalyst exceeded 110 $m^2/g$ Pt. In a separate beaker one gram of finely divided $TiO_2$ (such as P-25 manufactured by Degussa of Teterboro, NJ) was dispersed in 400 ml distilled water. The two suspensions were mixed together and stirred to bring them into intimate contact. The mixed suspensions were caused to floc by moderate heat. The solids were filtered off and dried providing an intimate mixture of $TiO_2$ and Pt/C catalyst. The mixture was heated to 930° C. in flowing $N_2$ and held at this temperature for one hour. The product was cooled to room temperature before exposing it to atmospheric air.

Electron microscopy and electrochemical measurements of several different batches made as indicated above gave specific surface areas of greater than 60 $m^2/g$ and as high as 80 $m^2/g$ of platinum in the alloy. X-ray diffraction analysis confirmed alloying in the form of Pt-Ti solid solution.

The catalyst made as described was tested as the cathode catalyst in phosphoric acid fuel cells (98% $H_3PO_4$ at 375° F.) and was found to have an activity for the reduction of oxygen at 0.9 V which was 90% higher than that of the 10 Pt/90 C. from which it was made (based on equivalent platinum loadings).

Example 2—Pt-Si/C

Several batches of a Pt-Si catalyst supported on carbon black were prepared by essentially the same method as described in Example 1 except that very finely divided $SiO_2$ (Aerosil-380 manufactured by Degussa) was substituted for the $TiO_2$. The co-suspension of $SiO_2$ and Pt/C flocced without heat. The filtered dried mixture was heated to 820° C. for one hour in nitrogen. The surface area of the metal in the product was greater than 60 $m^2/g$ and in certain batches greater than 85 $m^2/g$ of platinum in the alloy, and Pt-Si alloy formation was confirmed by X-ray diffraction. The supported alloy catalyst was fabricated into an electrode and tested in a fuel cell. Its activity for the reduction of oxygen in phosphoric acid was found to be 20% higher per mg of platinum than that of the original Pt/C catalyst from which it was made.

Example 3—Pt-Al/C

Degussa fumed $Al_2O_3$-C was used to prepare several batches of a catalyst using the method of Example 1. In this case a flocculating agent, $Al(NO_3)_3$, was used to coat the carbon surface with $Al_2O_3$ particles and form a co-floc.

A metal surface area greater than 59 $m^2/g$ and in some instances greater than 75 $m^2/g$ of platinum in the alloy was measured and X-ray diffraction confirmed Pt-Al alloying. The fuel cell tests showed 110% activity improvement over the precursor.

Example 4—Pt-Al-Si/C

Degussa fumed aluminum silicate (P-820) was used in the manner of Example 1 to obtain high surface area Pt-Al-Si ternary alloy supported on carbon black.

A metal surface area of 53 to 57 $m^2$ per gram of platinum in the catalyst was measured. The fuel cell tests showed about 30% increase in the activity over the Pt/C catalyst.

Example 5—Pt-Sr-Ti/C

Commercially available $SrTiO_3$ is not fine enough to be useful for preparing a uniform high surface area Pt-Sr-Ti ternary alloy catalyst. However, reacting $SrCO_3$ with high surface area $TiO_2$ (Degussa-P 25) at about 1100° C. gave relatively high surface area $SrTiO_3$.

$SrTiO_3$ prepared as indicated above was used in the manner of Example 1 to obtain high surface area Pt-Sr-Ti ternary alloy supported on carbon black. A metal surface area of about 51 $m^2/g$ of platinum in the catalyst was measured. The fuel cell tests showed about 20% increase in the activity over the Pt/C catalyst.

Example 6—Pt-Ce/C

Ten grams of catalyst consisting of 10% Pt by weight supported on carbon black (the same catalyst used in Example 1) was ultrasonically dispersed in 700 ml distilled water. In a separate beaker 1.0 gram of cerium ammonium sulphate was dissolved in 50 ml distilled water. The two were mixed together and chilled to 0°–10° C. while constantly stirring. The pH of this suspension was slowly increased to 5.0–6.0 using cold 1.0 N NaOH. It is believed that fine gelatinous hydrous ceric oxide, $CeO_2.xH_2O$ so formed is immediately adsorbed on the available surface of the carbon support and does not floc in the precipitate form.

After such treatment the solids were filtered and dried providing highly dispersed $CeO_2.xH_2O$ and highly dispersed Pt co-supported on carbon. The mixture was sub-divided in three batches and heated to 700° C., 800° C. and 950° C., respectively. Surface areas of 64, 68.9 and 52.6 $m^2/g$, respectively, of platinum in the catalyst were measured. X-ray diffraction analysis confirmed alloying. The fuel cell tests showed up to 40% increase in activity.

If a finely divided unsupported alloy is to be made in accordance with the present invention the starting materials would be a finely divided unsupported noble metal (such as platinum black) and a finely divided base metal oxide. A co-dispersion of these particles is formed in a fluid such as water or alcohol and the solids are thereafter separated from the liquid and dried. The dry solids are then heated in a reducing atmosphere to form the alloy in the same manner as described above.

Although the invention has been shown and described with respect to illustrative embodiments thereof, it should be understood by those skilled in the art that other changes, omissions and additions in the form and detail thereof may be made without departing from the spirit and scope of the invention.

Having thus described typical embodiments of our invention, that which we claim as new and desire to secure by Letters Patent of the U.S. is:

1. A fuel cell including phosphoric acid electrolyte and a cathode electrode, said electrode comprising an electrically conductive substrate and a layer of catalyst disposed on said substrate, said catalyst comprising a finely divided platinum-base metal alloy supported on conductive particles, said alloy having a catalytic activity for the reduction of oxygen greater than the catalytic activity of supported platinum in unalloyed form, and a surface area of at least 30 $m^2/g$ of platinum in the alloy.

2. The fuel cell according to claim 1 wherein the conductive support particles are carbon and the base metal is a refractory metal.

3. The fuel cell according to claim 2 wherein the refractory metal is selected from the group consisting of tungsten, aluminum, titanium, silicon, cerium, strontium, and combinations thereof.

4. The fuel cell according to claim 1 wherein said alloy has a surface area of at least 50 $m^2/g$ of platinum in the alloy.

5. A fuel cell comprising an anode electrode spaced apart from a cathode electrode and having an electrolyte disposed therebetween, said cathode electrode comprising a finely divided catalyst uniformly dispersed on conductive carbon support particles, said catalyst consisting of a platinum-refractory metal alloy having a catalytic activity for the reduction of oxygen greater than the catalytic activity of supported platinum in unalloyed form, and a surface area of at least 50 $m^2/g$ of platinum in the alloy.

6. A method for electrochemically reducing oxygen including the step of using, as a catalyst for said reduction, a finely divided noble metal-refractory metal alloy uniformly dispersed on support particles, said alloy having a catalytic activity for the reduction of oxygen greater than the catalytic activity of the supported noble metal in unalloyed form.

7. The method of claim 6 wherein the noble metal is platinum.

8. The method for electrochemically reducing oxygen in a fuel cell to produce electricity including the step of using, as a catalyst in the cathode electrode of the fuel cell, a finely divided platinum-refractory metal alloy uniformly dispersed on carbon support particles, said alloy having a catalytic activity for the reduction of oxygen greater than the catalytic activity of carbon supported platinum in unalloyed form.

9. The method of claim 8 wherein the refractory metal is selected from the group consisting of tungsten, aluminum, titanium, silicon, cerium, strontium, and combinations thereof.

10. The method of claim 8 or 9 wherein the fuel cell includes phosphoric acid as the electrolyte.

* * * * *

UNITED STATES PATENT AND TRADEMARK OFFICE
CERTIFICATE OF CORRECTION

PATENT NO. : 4,192,907
DATED : March 11, 1980
INVENTOR(S) : VINOD M. JALAN ET AL It is certified that error appears in the above-identified patent and that said Letters Patent are hereby corrected as shown below:

Column 4, line 26: "Ser. No. 922,044" should be --Ser. No. 922,004--.

Column 7, line 9: "nobel" should be --noble--.

Signed and Sealed this

Seventeenth Day of June 1980

[SEAL]

Attest:

SIDNEY A. DIAMOND

Attesting Officer

Commissioner of Patents and Trademarks